United States Patent
Müller

(10) Patent No.: US 11,360,841 B2
(45) Date of Patent: Jun. 14, 2022

(54) METHOD FOR MONITORING AN IOT DEVICE AND USING IT AS BATTERY PROTECTION WATCHDOG FOR IOT DEVICES

(71) Applicant: Shenzhen Goodix Technology Co., Ltd., Shenzhen (CN)

(72) Inventor: Peter Müller, Dresden (DE)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 0 days.

(21) Appl. No.: 17/018,013

(22) Filed: Sep. 11, 2020

(65) Prior Publication Data

US 2020/0409783 A1 Dec. 31, 2020

Related U.S. Application Data

(63) Continuation of application No. PCT/EP2018/069138, filed on Jul. 13, 2018.

(51) Int. Cl.
*G06F 11/00* (2006.01)
*G06F 11/07* (2006.01)
*G16Y 40/10* (2020.01)
*G16Y 20/20* (2020.01)

(52) U.S. Cl.
CPC .......... *G06F 11/079* (2013.01); *G06F 11/076* (2013.01); *G06F 11/0709* (2013.01); *G06F 11/0757* (2013.01); *G06F 11/0793* (2013.01); *G16Y 20/20* (2020.01); *G16Y 40/10* (2020.01)

(58) Field of Classification Search
CPC ............... G06F 11/079; G06F 11/0709; G06F 11/0757; G06F 11/076; G06F 11/0793; G06F 11/0796; G06F 11/0754; G06F 11/0751; G06F 11/0766
See application file for complete search history.

(56) References Cited

U.S. PATENT DOCUMENTS

| | | | |
|---|---|---|---|
| 10,097,572 B1 | 10/2018 | Sohail et al. | |
| 10,124,772 B1 * | 11/2018 | Hartman | ................... B06B 1/20 |
| 2015/0163121 A1 | 6/2015 | Mahaffey et al. | |

(Continued)

FOREIGN PATENT DOCUMENTS

| | | |
|---|---|---|
| EP | 3 349 398 A1 | 7/2018 |
| WO | 2016/140912 A1 | 9/2016 |

OTHER PUBLICATIONS

European Search Report dated Apr. 18, 2018 in corresponding European application No. 17 20 8359; 1 page.

(Continued)

*Primary Examiner* — Katherine Lin
(74) *Attorney, Agent, or Firm* — Maier & Maier, PLLC

(57) ABSTRACT

A method of monitoring an Internet-of-Things (IoT) device. An objective is to provide can detection of device malfunction issues, help to prevent hacking attacks and increase the reliability of IoT devices and IoT networks will be solved by monitoring functional behavior of the device; verifying the functional behavior and comparing the functional behavior with defined configuration functional behavior limits of the device; initiating an action by a watchdog associated with the IoT device based on the comparison between the functional behavior and the defined configuration functional behavior limits of the device.

20 Claims, 1 Drawing Sheet

(56) References Cited

U.S. PATENT DOCUMENTS

2016/0212099 A1   7/2016 Zou et al.
2017/0222815 A1*  8/2017 Meriac ................. G06F 21/554
2019/0079835 A1*  3/2019 You ..................... G06F 11/1497

OTHER PUBLICATIONS

International Search Report dated Mar. 13, 2019 in corresponding International application No. PCT/EP2018/069138; 4 pages.

* cited by examiner

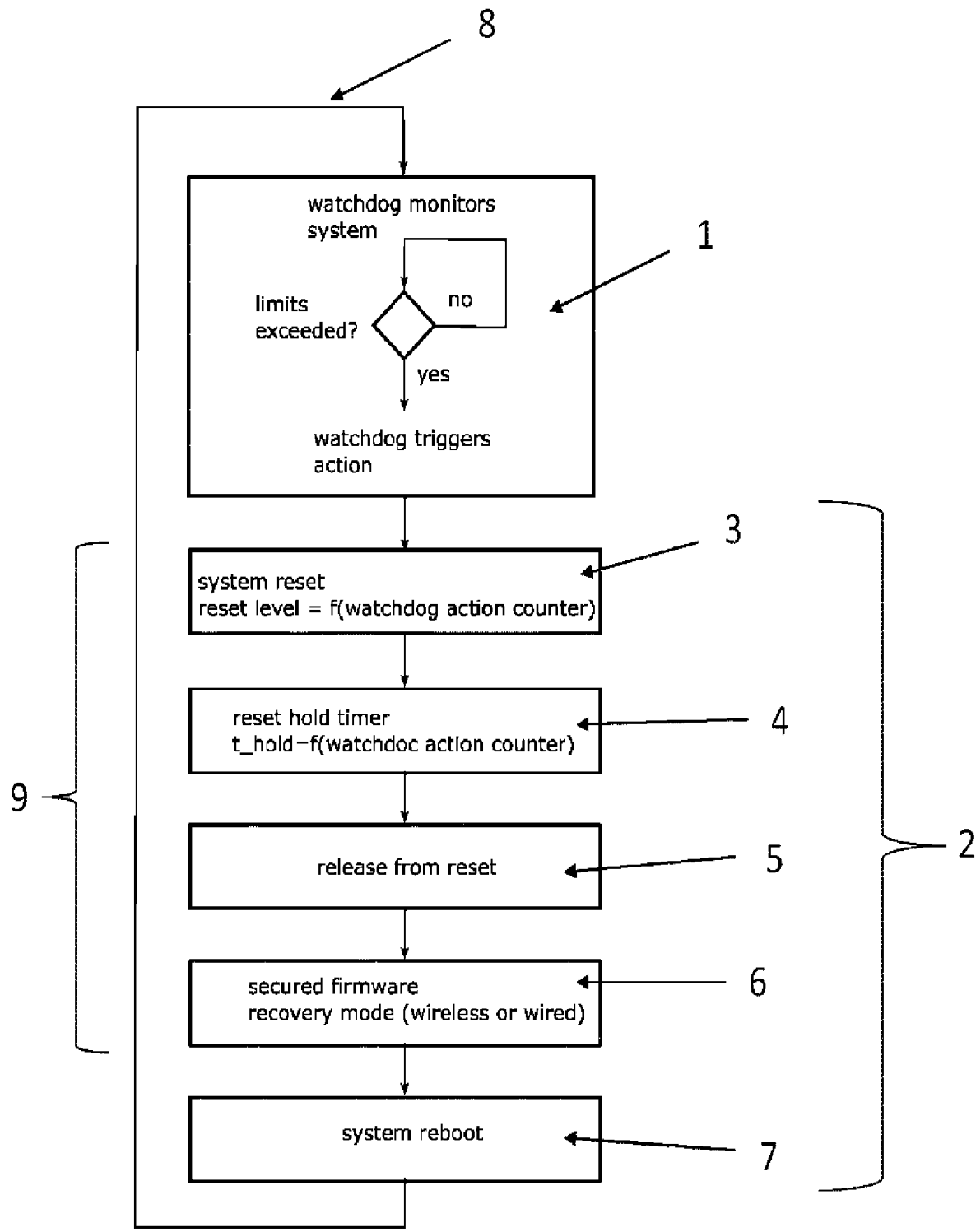

METHOD FOR MONITORING AN IOT DEVICE AND USING IT AS BATTERY PROTECTION WATCHDOG FOR IOT DEVICES

CROSS-REFERENCE TO RELATED APPLICATIONS

This application is a continuation of International Application No. PCT/EP2018/069138, filed on Jul. 13, 2018, which is hereby incorporated by reference in its entirety.

FIELD

The disclosure discloses a method of monitoring an Internet-of-Things (IoT) device.

BACKGROUND

The importance of securing these devices is gaining more and more focus. The present security level of many IoT devices is poor. First distributed denial of service (DDOS) attacks by smart home and IoT products have been registered in 2016. Successfully attacks on light control systems are already known.

Issue and failure monitoring solutions in present communication systems, e.g. PCs, notebooks, mobile phones or tablets, are mainly software based. But they can also contain issues and are sensitive to hacking attacks. Present solutions for IoT devices were derived from that kind of products but do not fully match to the need of these kinds of new products.

Hardware based and therefore software independent security features (watchdogs) are known on integrated circuit (IC) level for mainly IC protection purposes, e.g. under/over voltage protection and aging. The IC stops its activity if the watchdog notices that something is wrong.

A massive amount of network devices that physically cannot always be accessed to e.g. apply a hard reset by a reset button or removing/recharging the battery is a new topic that requires new technical solutions. Protecting the power supply from unwanted discharging is a common task for communication systems in aerospace applications but its high priority is rather new in very low-priced, high-volume consumer products.

The category of Internet-of-things (IoT) devices is rather new. These devices are usually connected to a network. They are cheaply produced and sold in large quantities. These products are of course not absolute free of hardware and software bugs.

Simple and robust methods need to be established to protect them from malfunction which may cause total device failure or an unwanted distortion of other devices and (network) services. Basic security features should be simple to implement and software independent to increase its reliability and to prevent them from hacking attacks.

Many IoT devices cannot be accessed physically once they put into operation. These are e.g. sensors in street grounds, animals or at other not easily accessible places. Protecting the battery power of these devices is important because the battery cannot be recharged or replaced. If the battery is discharged the complete system is destroyed. So, preventing the battery from unwanted discharging due to device malfunction issues (e.g. high computation load, permanent reboot or permanent RF transmission) due to a hardware/software failure or a hacking attack is important for IoT devices.

It is therefore the objective of the disclosure to provide a method or means that can detect device malfunction issues. The disclosure should help to prevent hacking attacks, increase the reliability of IoT devices and IoT networks, for example to protect the battery power of such devices and hence to overcome the above-mentioned problems.

SUMMARY

The objective of the disclosure will be solved by a method of controlling an Internet-of-Things (IoT) device, the method comprising: monitoring functional behavior of the device; verifying the functional behavior and comparing the functional behavior with defined functional behavior limits of the device; initiating an action by a watchdog associated with the IoT device based on the comparison between the functional behavior and the defined or configured functional behavior limits of the IoT device.

An IoT device is a physical device that comprises at least two parts. The first part offers specific functionalities, e.g. for industrial or private applications. This can be, for example, a thermometer that measures a temperature. Its main purpose is not communication or computation. The second part is a typically wireless communication modem. It provides networking capabilities that allow the device to link to a typically wireless or wired communication network and to exchange data.

The Internet of things is the network of such nonstandard communication and computation devices within the existing Internet infrastructure. Its linked IoT devices enable new services and business applications for e.g. home and industry automation and monitoring purposes.

The IoT device can be generally described as a state machine. It has several states and functions that describe the transition from one state to another state. Configuration data and trigger events impact the execution and the behavior of the functions. The order and kind of states that are reached and the frequency of triggered state transitions characterize the functional behavior of the state machine. There are rules and limits for this behavior. Some of them can be easily monitored and compared to defined/configured functional behavior limits.

State transitions are understood as functions that are called or processed in the IoT device. These functions can be triggered internally or externally. For example, a device can be woken up by an external received signal to transmit data or an internal timer may cause the device to wake up for data transmission. The trigger event and the function can be corrupted due to a hardware/software failure or an external hacking attack. This can cause partial or total system failure up to complete device damage when e.g. the battery is completely discharged.

Configuration data include all IoT device and network provider specific data that affects the behavior of the functions and states. These are e.g. the access data of the network provider, performance data of the modem, e.g. supported and unsupported functionality, timing information and calibration data.

Defined and/or configured functional behavior limits are understood as a kind of system or device setup data that defines e.g. time limits, counting limits and periods that should be advantageously derived from the IoT standard. The functional behavior limit data can be stored in the ROM code of the device. Thereby, the data are configurable but protected from software access, e.g. due to hacking attacks.

The watchdog compares the defined/configured functional behavior limits with the observed state machine behavior, hence the functional behavior of the IoT device. In this disclosure the watchdog is mainly a configurable hardware counter that compares measured counter values with time stamps and the given behavior limits for certain states and functions. The watchdog monitors e.g. how often and how long in a defined period functions are called and executed. So, in an embodiment, the method further comprises: if the functional behavior exceeds a defined functional behavior limit, the watchdog becomes active and triggers a dedicated system recovery sequence. If one of the measured access times or counter numbers, e.g. for one special function or state, exceeds the defined limit in the defined period, the watchdog becomes active and triggers a sequence of functions to recover the system from malfunction to normal operation, i.e., a so-called system recovery sequence.

In another embodiment the method further comprising: if the functional behavior stays beyond a defined functional behavior limit the watchdog remains passive and monitors and compares the functional behavior with the defined functional behavior limits of the device. Staying beyond a defined limit means that the system or device runs without failures. The watchdog does not need to interrupt the process in order to save battery power and to protect the device from complete failure.

It is also preferred if the watchdog of the functional behavior is integrated into other common watchdog systems that are monitoring parameters, especially temperature or aging or under- and overvoltage values. The decision process to become the watchdog active may become more complex but this increases the reliability and lifetime by a multiple.

In another preferred embodiment of the inventive method the watchdog is a configurable hardware counter that monitors the functional behavior by a counter value and the counter value is compared with defined time stamps and given time limits and/or by value levels compared with defined limits. A counter value is a parameter which is used to detect how often e.g. a process has been requested, for example a RF reception and/or transmission requested. Due to the counter value that is compared with defined time stamps and given time limits configured in the functional behavior limits the watchdog decides if a process must be interrupted or not. The same applies to value levels which are also parameters that are monitored and compared with pre-defined functional behavior limits in the system configuration data.

The special effect will be seen therein, that by simply measuring and monitoring system parameters the overall performance and reliability of the device and hence the lifetime of the device can be increased. Detecting a system issue and triggering a dedicated system recovering sequence without the need of a human operator has the effect, that malfunctions of the device can be detected and repaired quickly and self-contained. This prevents the device from wasting battery power for e.g. high computation load, permanent reboot or permanent RF transmission. This is especially important for IoT devices which are fabricated in high volume for low price and are used in scenarios where these devices cannot be accessed physically once they are put into operation.

In a preferred embodiment the system recovery sequence comprises a watchdog, a system reset routine, a reset hold and release timer, a secured firmware recovery routine and a system reboot routine.

Thereby, the system reset routine, the reset hold and release timer, the secured firmware recovery routine and the system reboot routine are configurable. This is needed to automatically adapt the recovery procedure to the issue occurred. And at least if the issue cannot be solved to stop endless triggering of the system recovery sequence, to protect the battery power, to wait for an operator and not to distort the network by unwanted transmissions, etc.

It is very advantageous if the watchdog comprises a watchdog action counter. The watchdog counter is used to determine if the system recovery sequence was successful or not. This special watchdog action counter is used to monitor how often in a certain time the watchdog triggers an action. It also considers the runtime of the system recovery sequence.

The system recovery sequence was unsuccessful if the time between the completed system recovery sequence and the new triggered action is relatively short. Then, the system recovery sequence is going to rerun in an increased reset level with other parameters. The amount of reset parameters and the reset and hold time will be increased. The reset parameters may change as well. From a certain reset level upwards is may also be possible to replace the firmware in a secured firmware recovery mode.

If the time between the completed system recovery sequence and the new triggered action is rather long a new issue is occurred. The system recovery sequence starts with its initial configuration.

The system reset routine is used to reset certain system parameters. The amount and the values of parameters that were reset depend on the reset level that is determined from the watchdog action counter. The more the system recovery sequence is triggered, which increases the watchdog action counter the more parameters were restored to default.

The system reboot routine is used to reboot the system with the new parameters.

In a further embodiment of the disclosure the secured firmware recovery mode can be accessed by the system recovery sequence from a certain reset level upwards to replace the system firmware. To do so the system can somehow wait for external help e.g. by an administrator which can replace the system firmware.

The reset and hold time can be increased as a function of the reset level and/or at a certain reset level the device can be switched off by itself not distort other devices or network services.

It is also preferred if the system recovery sequence can reset different system parameters depending on the watchdog action counter which may lead to a factory reset at some stage.

In another embodiment of the inventive method, the system recovery sequence can stop working or wait for external action/triggering depending on the watchdog action counter. To stop or wait very long for external action/triggering is useful if the system recovery sequence cannot help to overcome the root cause of the detected issue.

In another preferred embodiment of the inventive method the watchdog data, e.g. the reset level value, timers and counters in the IoT device are kept and running while the IoT device is in reset state to be able to determine the configuration for the next run of the system recovery sequence.

Furthermore, it is advantageous if the watchdog and the system recovery sequence are used to prevent a battery of the IoT device from discharging by interrupting processes that exceed defined time limits or counting limits and periods. By interrupting processes which are caused by a malfunction or a hacking attack of the device or system, the battery of the device can be prevented from discharging. The malfunction or hacking attack are detected by the abnormal behavior of the device, e.g. if the device permanently try to reboot or has an abnormal high computation load. This abnormal behavior will be detected by the watchdog which monitors timer limits and reset levels of the device.

The disclosure will be explained in more detail using an exemplary embodiment.

BRIEF DESCRIPTION OF THE DRAWINGS

The appended drawing show:

FIG. 1 system recovery sequence triggered by a watchdog.

DETAILED DESCRIPTION OF THE EMBODIMENTS

FIG. 1 shows the inventive method of controlling a data processing IoT device especially the battery of such device which comprises a hardware watchdog 1 that monitors how often and how long in a defined period basic system functions are called to monitor the amount of drawn battery power.

If one of the measured access times or counter numbers exceeds the given limit in the defined period, the watchdog becomes active and triggers a dedicated system recovery sequence 2. The system recovery sequence can automatically adapt to the problem encountered and stop if the problem cannot be solved. This prevents the system from unwanted battery discharging which may lead to complete system failure as the battery of IoT devices often cannot be replaced or recharged. Only the watchdog 1 together with a smart system recovery sequence 2 provides the benefit of extended battery protection. This enhances the system robustness against software issues and hacking attacks. The system becomes more secured against software/hardware failures and hacking attacks to protect the system from permanent device damage.

This disclosure describes a hardware watchdog 1 that monitors how often and how long in a defined period system functions are called. Some important system functions are RF reception, RF transmission and system reboot. If one of the measured access times or counter numbers exceed the defined limit in the defined period, the watchdog 1 becomes active and triggers a dedicated system recovery sequence 2, see FIG. 1.

The watchdog 1 is a configurable hardware counter that compares measured counter values with time stamps and given time limits.

The watchdog configuration data, e.g. time limits, counting limits and periods should be derived from the IoT standard. They should be configurable but protected from software access e.g. due to hacking attacks. So, parameters stored in the ROM code may be the preferred solution.

The system recovery sequence 2 should in general consist of the elements listed below. External access to replace the system firmware 6 should be possible as well but may not be required. The reset hold time 4, see FIG. 1, should also be depending on a watchdog counter value. As an example, it does not make sense to prevent from permanent system reboot 7 if the watchdog only calls a reboot sequence. If the loop 8 "watchdog triggers action-system recovery sequence-watchdog triggers action" cannot be leaved by the system itself the reset hold time 4 should be increased depending on a watchdog action counter value. To do so the system can somehow wait for external help e.g. by an administrator which can replace the system firmware. This wait time can be increased or at a certain limit of reboots the device can be switched by itself not distort other devices or network services.

The reset level 3 should also depend on the amount watchdog action counts is a certain period. So, e.g. at higher cycle counts the system should not only apply a system reboot 7. It can also start to reset different system parameters depending on the watchdog action counter which may e.g. lead to a factory reset at some stage.

The system reset 3 should be independent from the watchdog. This means all watchdog data, timers and counters should be kept and running while system is in reset state.

The watchdog 1 may observe more processes and functions. The decision process to become the watchdog 1 active may become more complex. Further parameters e.g. temperature may be taken under consideration as well. The watchdog 1 may be integrated into other standard watchdogs e.g. temperature, aging or overvoltage watchdogs.

The recovery sequence 2 may be improved by more added elements, sub sequences and conditional sequence executions.

What is claimed is:

1. A method of monitoring an Internet-of-Things (IoT) device, the method comprising:
monitoring, by a hardware watchdog associated with the IoT device, functional behavior of the IoT device;
verifying, by the hardware watchdog, the functional behavior of the IoT device;
comparing, by the hardware watchdog, the functional behavior of the IoT device with defined functional behavior limits of the IoT device;
initiating, by the hardware watchdog, an action based on the comparison between the functional behavior of the IoT device and the defined functional behavior limits of the IoT device;
the method further comprising: when the functional behavior exceeds a defined functional behavior limit, the hardware watchdog becomes active and triggers a dedicated system recovery sequence, wherein the system recovery sequence comprises the hardware watchdog, a system reset routine, a reset hold and release timer, a secured firmware recovery routine and a system reboot routine, and the secured firmware recovery routine is capable of being accessed by the system recovery sequence from a certain reset level upwards to replace a system firmware.

2. A method of monitoring an Internet-of-Things (IoT) device, the method comprising:
monitoring, by a hardware watchdog associated with the IoT device, functional behavior of the IoT device;
verifying, by the hardware watchdog, the functional behavior and comparing the functional behavior with defined functional behavior limits of the device; initiating, by the hardware watchdog, an action based on the comparison between the functional behavior and the defined or configured functional behavior limits of the IoT device;
the method further comprising: when the functional behavior of the IoT device exceeds a defined functional behavior limit, the hardware watchdog becomes active and triggers a dedicated system recovery sequence,
wherein the system recovery sequence is capable of resetting different system parameters depending on a watchdog action counter, and the resetting different system parameters is capable of leading to a factory reset.

3. The method according to claim 1, further comprising:
when the functional behavior stays beyond the defined functional behavior limit, the hardware watchdog remains passive, and monitors and compares the functional behavior with the defined functional behavior limits of the device.

4. The method according to claim 1, wherein the hardware watchdog of the functional behavior is integrated into other common watchdog systems that are monitoring temperature, aging, and under- and overvoltage values.

5. The method according to claim 4, wherein the hardware watchdog is a configurable hardware counter that monitors the functional behavior by:
a counter value compared with defined time stamps and given time limits; and/or
value levels compared with defined limits.

6. The method according to claim 1, wherein the system reset routine, the reset hold and release timer, the secured firmware recovery routine and the system reboot routine are configurable.

7. The method according to claim 1, wherein the hardware watchdog comprises a watchdog action counter.

8. The method according to claim 1, wherein the system recovery sequence is capable of resetting different system parameters depending on a watchdog action counter.

9. The method according to claim 8, wherein the resetting different system parameters are capable of leading to a factory reset.

10. The method according to claim 1, wherein the system recovery sequence stops working or wait for external action/triggering depending on a watchdog action counter.

11. The method according to claim 1, wherein watchdog data are kept and running while the IoT device is in reset state to be able to determine the configuration for a next run of the system recovery sequence.

12. The method according to claim 11, wherein the watchdog data comprise a reset level value, timers, and counters in the IoT device.

13. The method according to claim 1, wherein the hardware watchdog and the system recovery sequence are used to prevent a battery of the IoT device from discharging by interrupting processes that exceed defined time limits or counting limits and periods.

14. The method according to claim 5, wherein the hardware watchdog comprises the configurable hardware counter that compares measured counter values with time stamps and given behavior limits for states and functions.

15. The method according to claim 1, wherein the hardware watchdog monitors how often and how long in a defined period functions are called and executed.

16. The method according to claim 5, wherein the counter value is a parameter which is used to detect how often a process is requested.

17. The method according to claim 16, wherein the counter value is a parameter which is used to detect how often an RF reception and/or transmission is requested.

18. The method according to claim 2, further comprising:
when the functional behavior stays beyond the defined functional behavior limit, the hardware watchdog remains passive, and monitors and compares the functional behavior with the defined functional behavior limits of the device.

19. The method according to claim 2, wherein the hardware watchdog of the functional behavior is integrated into other common watchdog systems that are monitoring temperature, aging, and under- and overvoltage values.

20. The method according to claim 19, wherein the hardware watchdog is a configurable hardware counter that monitors the functional behavior by:
a counter value compared with defined time stamps and given time limits; and/or
value levels compared with defined limits.

* * * * *